(12) United States Patent
Licht et al.

(10) Patent No.: US 12,269,247 B2
(45) Date of Patent: Apr. 8, 2025

(54) PROCESS FOR RECYCLING OF BONDED ARTICLES

(71) Applicant: BASF SE, Ludwigshafen am Rhein (DE)

(72) Inventors: Ulrike Licht, Ludwigshafen am Rhein (DE); Oliver Hartz, Ludwigshafen am Rhein (DE); Lionel Gehringer, Ludwigshafen am Rhein (DE); Sabine Bociek, Ludwigshafen am Rhein (DE); Erich Ries, Ludwigshafen am Rhein (DE); Juergen Ahlers, Gross-Rohrheim (DE); Stephan Dohmen, Lemfoerde (DE)

(73) Assignee: BASF SE, Ludwigshafen Am Rhein (DE)

( * ) Notice: Subject to any disclaimer, the term of this patent is extended or adjusted under 35 U.S.C. 154(b) by 174 days.

(21) Appl. No.: 18/008,509

(22) PCT Filed: May 21, 2021

(86) PCT No.: PCT/EP2021/063664
§ 371 (c)(1),
(2) Date: Dec. 6, 2022

(87) PCT Pub. No.: WO2021/249749
PCT Pub. Date: Dec. 16, 2021

(65) Prior Publication Data
US 2023/0211598 A1  Jul. 6, 2023

(30) Foreign Application Priority Data
Jun. 9, 2020 (EP) .................................. 20178965

(51) Int. Cl.
| | | |
|---|---|---|
| B32B 43/00 | (2006.01) | |
| B32B 1/08 | (2006.01) | |
| B32B 5/02 | (2006.01) | |
| B32B 5/18 | (2006.01) | |
| B32B 5/24 | (2006.01) | |
| B32B 7/12 | (2006.01) | |

(52) U.S. Cl.
CPC .............. *B32B 43/006* (2013.01); *B32B 1/08* (2013.01); *B32B 5/022* (2013.01); *B32B 5/026* (2013.01); *B32B 5/18* (2013.01); *B32B 5/245* (2013.01); *B32B 7/12* (2013.01); *B32B 2250/02* (2013.01); *B32B 2255/26* (2013.01); *B32B 2262/0276* (2013.01); *B32B 2266/0278* (2013.01); *B32B 2266/0292* (2013.01); *B32B 2307/748* (2013.01); *B32B 2433/04* (2013.01); *B32B 2437/02* (2013.01)

(58) Field of Classification Search
CPC ......... B32B 43/006; B32B 1/08; B32B 5/022; B32B 5/026; B32B 5/18; B32B 5/245; B32B 7/12; B32B 2250/02; B32B 2255/26; B32B 2262/0276; B32B 2266/0278; B32B 2266/0292; B32B 2307/748; B32B 2433/04; B32B 2437/02
USPC ........................................................ 156/703
See application file for complete search history.

(56) References Cited

U.S. PATENT DOCUMENTS

| | | |
|---|---|---|
| 3,412,054 A | 11/1968 | Milligan et al. |
| 3,905,929 A | 9/1975 | Noll |
| 3,920,598 A | 11/1975 | Reiff et al. |
| 4,192,937 A | 3/1980 | Nachtkamp et al. |
| 4,269,748 A | 5/1981 | Nachtkamp et al. |
| 4,292,226 A | 9/1981 | Wenzel et al. |
| 5,030,378 A | 7/1991 | Venegas |
| 5,135,963 A | 8/1992 | Haeberle et al. |
| 6,069,182 A | 5/2000 | Naber et al. |
| 2003/0176309 A1 | 9/2003 | Beers et al. |
| 2018/0235316 A1* | 8/2018 | Gonzalez de los Santo ............... A43B 13/32 |
| 2018/0264797 A1 | 9/2018 | Zhang |

FOREIGN PATENT DOCUMENTS

| | | |
|---|---|---|
| CA | 1129128 A | 8/1982 |
| DE | 1495745 A1 | 6/1969 |
| DE | 1954090 A1 | 5/1971 |
| DE | 2034479 A1 | 1/1972 |
| DE | 3911827 A1 | 10/1990 |
| DE | 102004014165 A1 | 12/2004 |
| EP | 0733669 A2 | 9/1996 |
| GB | 1078202 A | 8/1967 |
| GB | 1339357 A | 12/1973 |
| WO | 03/64582 A1 | 8/2003 |
| WO | 2007/082826 A2 | 7/2007 |
| WO | 2007/082838 A1 | 7/2007 |

(Continued)

OTHER PUBLICATIONS

International Search Report and Written Opinion received for PCT Patent Application No. PCT/EP2021/063664, mailed on Aug. 20, 2021, 8 pages.

*Primary Examiner* — James D Sells

(74) *Attorney, Agent, or Firm* — Faegre Drinker Biddle & Reath LLP

(57) ABSTRACT

A method is described for debonding a bonded article. The bonded article comprises at least two components which are bonded to one another by means of a polyurethane adhesive selected from aqueous polyurethane dispersion adhesives and polyurethane hotmelt adhesives. At least one of the components is a thermoplastic polyurethane. The components are debonded by treatment with an aqueous surfactant composition at elevated temperatures.

18 Claims, No Drawings

(56) References Cited

FOREIGN PATENT DOCUMENTS

| | | |
|---|---|---|
| WO | 2008/074635 A1 | 6/2008 |
| WO | 2011/060028 A1 | 5/2011 |
| WO | 2012/013506 A1 | 2/2012 |
| WO | 2013/153190 A1 | 10/2013 |
| WO | 2015/052265 A1 | 4/2015 |
| WO | 2018/156689 A1 | 8/2018 |
| WO | 2019/175151 A1 | 9/2019 |
| WO | 2019/243293 A1 | 12/2019 |

* cited by examiner

PROCESS FOR RECYCLING OF BONDED ARTICLES

CROSS-REFERENCE TO RELATED APPLICATIONS

This application is a National stage application (under 35 U.S.C. § 371) of PCT/EP2021/063664, filed May 21, 2021, which claims benefit of European Application No. 20178965.8, filed Jun. 9, 2020, both of which are incorporated herein by reference in their entirety.

A method is described for debonding a bonded article comprising at least two components which are bonded to one another by means of a polyurethane adhesive. At least one of the components is a thermoplastic polyurethane. The components are debonded by treatment with an aqueous surfactant composition at elevated temperatures.

Many consumer goods are made of multiple components of different materials which are bonded to one another by an adhesive. Such bonded articles are difficult to recycle and it is difficult to re-use the single materials because they have to be de-bonded before re-use. Consumer good manufactures increasingly demand concepts to increase sustainability by increasing recycle rates of used bonded articles. For example, high performance sport shoes are often based on thermoplastic polymers such as thermoplastic polyurethanes which are bonded to non-polyurethane materials such as polyester textiles or synthetic leather. The non-polyurethane materials have to be removed after the life cycle of the article by a debonding on demand mechanism before recycling and re-use of the thermoplastic polyurethane.

Similar needs exist in other technical areas to release bonded components of different materials to be able to separately recycle the different materials, for example car seats, dashboards, meat or cheese food packaging etc. WO 2019/175151 for example describes a method for making thermoplastic polyurethanes from recycled polyurethane materials. This method requires debonding non-polyurethane materials from the polyurethane materials. WO 2018/156689 describes de-bondable adhesives and uses thereof for making and debonding articles of footwear. Debonding is achieved by use of carboxylic acids and salts thereof and by use of microwave irradiation.

There remains a need for improved methods particularly in the footwear industry that facilitate the recycling of shoe components. The problem on which the invention is based is that of providing a method for debonding of bonded articles made of different components, such as for example shoes, to recycle the different components (e.g. upper materials and soles) under mild conditions, with comparatively low energy consumption in short cycle-times. The bonded articles should, under normal storage, use and cleaning conditions, exhibit high resistance to premature debonding. It is a challenge to meet these contradicting conditions: providing materials with high bond strength during regular use of the articles but which when subjected to stimulation by suitable conditions are easily de-bonded on demand in short time for recycling purposes.

The problem is solved in accordance with the invention by a method for debonding a bonded article, wherein the bonded article comprises at least a first component and a second component which are bonded to one another by means of a polyurethane adhesive with a K value of not more than 100 measured as 1 wt. % solution in DMF at 25° C., wherein the first component is made from a thermoplastic polymer, preferably made from a thermoplastic elastomer, more preferably made from an expanded thermoplastic elastomer;

wherein the polyurethane adhesive is selected from aqueous polyurethane dispersion adhesives and polyurethane hotmelt adhesives;

and the at least two components are debonded by treatment with an aqueous surfactant composition at a temperature from 60° C. to 130° C., preferably from 60° C. to 100° C. or from 70° C. to 100° C., and at a pH of 4 to 12, preferably from 6 to 10.

It was found, that aqueous polyurethane-dispersion adhesives lead to high bond strength in the bonded articles under dry conditions as well as in humid air, but can be debonded by using liquid water, elevated temperature and surfactants and do not or at least not significantly interfere with subsequent recycling of the debonded thermoplastic polymer materials of the first component. The polyurethanes may be polyester-based, but may also be polyether based. With those can be demonstrated, that not hydrolysis is the reason for debonding, but primarily delamination. So pH values in the claimed process can vary in a wide range of from 4 to 12, while slightly or highly alkaline conditions (pH of more than 7 and up to 12) enhance the delamination. Preferably, the polyurethane is non-crosslinked, with a K-value of from 50 to 90, debonding occurs at temperatures between 70° C. and 130° C. in a few minutes. Laundry washing of the bonded articles is possible without debonding if the washing temperature is kept below 40° C.

The K value is a relative viscosity number, which is determined in analogy to DIN 53 726 at 25° C. It comprises the flow rate of a 1 weight % strength solution of the polyurethane in DMF, relative to the flow rate of pure DMF, and characterizes the average molecular weight of the polyurethane.

Bonded Article:

The bonded article comprises at least two components which are bonded to one another. Bonded articles are for example an extruded article, an injection molded article, a pressed article, a foamed article, a cable sheath, a hose, a profiled element, a drive belt, a fiber material, a nonwoven, a film, a molded part, a sole, a sporting good, an article of footwear, a plug, a housing, or a damping element for the electrical industry, for the automobile industry, for machine construction, for 3D printing, for medicine, or for consumer goods. Preferred bonded articles are articles of footwear, parts of articles of footwear, car seats, dashboards, meat or cheese food packaging etc. More preferred are articles of footwear or parts of articles of footwear. The bonded articles can be formed with the use of the polyurethane adhesive (preferably an aqueous polyurethane dispersion adhesive) by coating one or both components with the adhesive and contacting the components with one another.

The article of footwear is preferably selected from the group consisting of a shoe, a boot, and a sandal. Suitable shoes are for example an athletic shoe, a tennis shoe, a cross-trainer shoe, a soccer shoe, a children's shoe, a dress shoe, and a casual shoe.

The bond strength is preferably from about 5 N/50 mm to material break, more preferably from about 10 N/50 mm to about 200 N/50 mm, most preferably from about 20 N/50 mm to about 150 N/50 mm. The bond strength is measured by a peel test as described in the examples.

First Component:

The first component of the bonded article is made from a thermoplastic polymer. The thermoplastic polymer is preferably a thermoplastic elastomer, more preferably an expanded thermoplastic elastomer. A thermoplastic polymer is a plastic polymer material that becomes pliable or moldable at a certain elevated temperature and solidifies upon cooling. Example of thermoplastic polymers are thermoplastic polyethylene, thermoplastic polypropylene, thermoplastic polyvinyl chloride, thermoplastic polystyrene, thermoplastic polyamides, thermoplastic polyesters, and thermoplastic polyurethanes. Thermoplastic elastomers preferably consist of phase-separated block copolymers and combine the performance benefits of rubber like flexibility and elasticity with the easy processability of thermoplastic polymers.

Suitable materials for the first component are thermoplastic elastomers, for example selected from the group consisting of thermoplastic polyurethane (TPU), thermoplastic copolyamide (for example thermoplastic copolyetherpolyamide), thermoplastic copolyester elastomer (for example copolyetherester or copolyesterester), styrenic block copolymers (for example styrene-butadiene block copolymer) thermoplastic ethylene vinylacetate and mixtures or blends thereof.

When a thermoplastic polyurethane is used, the thermoplastic polyurethane may be any desired thermoplastic polyurethane known to a person skilled in the art. Thermoplastic polyurethanes and their methods of making have already been extensively described, for example in Gerhard W. Becker and Dietrich Braun, Kunststoffhandbuch, Volume 7, Polyurethane, Carl Hanser Verlag, Munich, Vienna, 1993. The thermoplastic polyurethane is preferably prepared by reacting a mixture of isocyanates with isocyanate-reactive compounds, preferably having a molecular weight of 0.5 kg/mol to 10 kg/mol and optionally chain-extending agents, preferably having a molecular weight of 0.05 kg/mol to 0.5 kg/mol. The thermoplastic polyurethane is preferably prepared by further adding to the mixture at least one chain transfer agent, a catalyst and optionally at least one filler, auxiliary or additive.

Expanded polymers, also known as foamed materials, or foams, and particularly expanded polymer particles, also called particle foams, are known and have been extensively described in the literature, for example in Ullmann's "Enzyklopädie der technischen Chemie", 4th edition, volume 20, p. 416 ff. Most preferred materials for the first component are expanded thermoplastic polyurethanes (E-TPU). Suitable E-TPU and methods of their production are described for example in WO 2007/082838, in WO2013/153190 or in WO2015/052265.

The polyurethane of the expanded thermoplastic polyurethane can be prepared by reacting a mixture of isocyanates and isocyanate-reactive compounds. Preferred are aliphatic, cycloaliphatic, and/or aromatic isocyanates as organic isocyanates. Particular preference is given to using aromatic, aliphatic and/or cycloaliphatic diisocyanates. Examples of preferred diisocyanates are trimethylene diisocyanate, tetramethylene diisocyanate, pentamethylene diisocyanate, hexamethylene diisocyanate, heptamethylene diisocyanate, octamethylene diisocyanate, 2-methyl-1,5-pentamethylene diisocyanate, 2-ethyl-1,4-butylene diisocyanate, 1,5-pentamethylene diisocyanate, 1,4-butylene diisocyanate, 1-isocyanato-3,3,5-trimethyl-5-isocyanatome-thylcyclohexane, 1,4-bis(isocyanatomethyl)cyclohexane, 1,3-bis(isocyanatomethyl)cyclohexane, 1,4-cyclohexane diisocyanate, 1-methyl-2,4-cyclohexane diisocyanate, 1-methyl-2,6-cyclohexane diisocyanate, 2,2'-dicyclohexylmethane diisocyanate, 2,4'-dicyclohexylmethane diisocyanate, 4,4'-dicyclohexylmethane diisocyanate, 2,2'-diphenylmethane diisocyanate, 2,4'-diphenylmethane diisocyanate, 4,4'-diphenylmethane diisocyanate, 1,5-naphthylene diisocyanate, 2,4-tolylene diisocyanate, 2,6-tolylene diisocyanate, diphenylmethane diisocyanate, 3,3'-dimethylbiphenyl diisocyanate, 1,2-diphenylethane diisocyanate and phenylene diisocyanate.

The isocyanate-reactive compounds comprise at least one compound having at least two isocyanate-reactive hydrogen-containing groups. The isocyanate-reactive hydrogen-containing group is preferably a hydroxyl group. It is particularly preferable for the compound having at least two isocyanate-reactive hydrogen-containing groups to be selected from polyetherol, polyesterol and polycarbonate diol. In this context, polyesterols, polyetherols and/or polycarbonate diols are usually also subsumed under the term "polyols". The thermoplastic polyurethane is preferably prepared from at least one polyether alcohol. It is particularly preferable to use polyether diol. Polytetrahydrofuran is a particularly preferred polyether diol. Preference is given to using polyether alcohols and polytetrahydrofuran having a molecular weight between 0.6 kg/mol and 2.5 kg/mol. The polyether alcohols are used individually or as a mixture of various polyether alcohols.

Second Component of Bonded Article

Suitable materials for the second component of the bonded article are for example those commonly found in the footwear industry and can be selected for example from the group of materials mentioned for the first component or selected from the group consisting of a crepe rubber, a natural leather, a synthetic leather, a polyurethane (for example a polyurethane foam and/or a thermoplastic polyurethane TPU), a thermoplastic rubber, a styrene butadiene rubber, a polyvinyl acetate, a polyamide (PA), a polyvinyl chloride, a polystyrene, an acrylonitrile butadiene styrene, a polyethylene terephthalate (PET), a polybutylene terephthalate, a textile, a fabric, a thermoplastic polyurethane knit fiber and a combination thereof. Preferred is a shoe upper made of PET, TPU or PA. Most preferred is a shoe upper made of PET.

A preferred bonded article is an article wherein a first component is an expanded thermoplastic polyurethane and a second component is a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a polyethylene terephthalate, a textile, a fabric, and a combination thereof.

An aspect of the invention is a recyclable article of footwear or portion thereof comprising a first component, a second component, and a polyurethane adhesive adhesively bonding the first component to the second component wherein at least one of the components is made from thermoplastic polyurethane, preferably from an expanded thermoplastic polyurethane;

wherein the polyurethane adhesive is selected form aqueous polyurethane dispersion adhesives and polyurethane hotmelt adhesives;

and the first and second components are de-bondable by treatment with an aqueous surfactant composition at a temperature from 60° C. to 130° C., preferably from 60° C. to 100° C. or from 70° C. to 100° C.; and at a pH of 4 to 12, preferably from 6 to 10.

The first component, the second component, or both can be any components commonly found in an article of footwear, and preferably comprise a component selected from the group consisting of an upper, an insole, an outsole, a midsole, a strobel, a vamp, a tip, a foxing, a tongue, an eyestay, and a combination thereof. For example, the polyurethane adhesives can adhesively bond an upper and an outsole, an upper and an insole, a midsole and an outsole, or any other combination of components commonly found in the footwear industry.

Preferably, the first component is a shoe sole made of thermoplastic polyurethane; and the second component is a shoe upper, preferably made of polyethylene terephthalate. The first component shoe sole preferably contains a midsole made of expanded thermoplastic polyurethane. The adhesive bonds the shoe upper and the shoe sole and/or the midsole.

In some aspects, the adhesives bond two sole components such as an outsole and a midsole. In some aspects, the adhesives bond a sole or sole component to an upper (or to a component of the upper). In some aspects, the upper component is a vamp or a quarter. For example, a polyurethane adhesive described herein can be used to bond an upper surface of an outsole to a lower surface of a midsole. This will allow for easier debonding of the outsole and midsole. An adhesive described herein can be used to bond an upper surface of a midsole to a lower surface of an upper. This will allow for easier debonding of the sole from the upper.

For example a shoe can be formed from a shoe sole and an upper, and the shoe sole includes a shoe outsole and a shoe midsole. Each of these components can be bonded using a de-bondable adhesive described herein. The use of de-bondable adhesives described herein allows for easy debonding, for example for separate recycling of the materials of the upper, the shoe outsole, and/or the shoe midsole.

PU Adhesive

The polyurethane adhesive is selected form aqueous polyurethane dispersion adhesives and polyurethane hotmelt adhesives. The polyurethane adhesive has a K value (measured as 1 wt. % solution in DMF at 25° C.) of not more than 100, preferably from 45 to 100, more preferably from 50 to 90.

Crosslinked polyurethane adhesives (e.g. by formulating with water-based polyisocyanates; or 1-component reactive polyurethanes or 2-component reactive polyurethanes) are possible, but need higher de-bonding washing temperatures between 90 and 130° C. and longer de-bonding times. Therefore, the polyurethane adhesives preferably are non-reactive.

PU Dispersion

An aqueous polyurethane dispersion adhesive comprises at least one polyurethane as polymeric binder dispersed in water, and optionally additives, such as fillers, thickeners, antifoam agents, etc. The polymeric binder preferably takes the form of dispersion in water or else in a mixture made of predominantly water and of water-soluble organic solvents with boiling points which are preferably below 150° C. (1 bar). Particular preference is given to water as sole solvent. The water or other solvents are not included in the calculation of weight data relating to the constitution of the adhesive, unless otherwise noted.

The polyurethane dispersion adhesives of the invention comprise at least one polyurethane. Suitable polyurethanes are obtainable in principle through reaction of at least one polyisocyanate with at least one compound which has at least two groups reactive toward isocyanate groups. Polyurethanes of the invention also encompass what are called polyurethane-poly-ureas, which as well as polyurethane groups also have urea groups as well.

The polyurethane dispersion of the invention preferably comprises at least one polyurethane which comprises in copolymerized form at least one polyisocyanate and at least one polymeric polyol. Suitable polymeric polyols are preferably selected from polyester diols, polyether diols, and mixtures thereof. The polymeric polyol preferably has a number-average molecular weight in the range from about 500 to 5000 g/mol. Polymeric diols are preferred. The polyurethane dispersion of the invention preferably comprises at least one polyurethane which comprises in copolymerized form at least one polyisocyanate and a diol component, of which a) 10-100 mol %, based on the total amount of the diols, have a molecular weight of 500 to 5000 g/mol and b) 0-90 mol %, based on the total amount of the diols, have a molecular weight of 60 to 500 g/mol.

The polyurethane is preferably synthesized to an extent of at least 40% by weight, more preferably at least 60% by weight, and very preferably at least 80% by weight, based on the total weight of the monomers used in preparing the polyurethane, of at least one diisocyanate and at least one polyether diol and/or polyester diol. Suitable further synthesis components to 100% by weight are, for example, the below-specified polyisocyanates having at least three NCO groups, and compounds that are different from the polymeric polyols and have at least two groups reactive toward isocyanate groups. These include, for example, non-polymeric diols; diamines; polymers different from polymeric polyols and having at least two active hydrogen atoms per molecule; compounds which have two active hydrogen atoms and at least one ionogenic or ionic group per molecule; and mixtures thereof.

The polyurethane of the aqueous polyurethane dispersion adhesive preferably has crystallinity. The melting point is preferably from 40 to 70° C.

Preferred polyurethanes are synthesized from:

a) at least one monomeric diisocyanate, b) at least one diol, component (b) comprising at least one diol having a number-average molecular weight in the range from 500 to 5000 g/mol, c) at least one monomer, different from the monomers (a) and (b), having at least one isocyanate group or at least one group reactive toward isocyanate groups, and additionally carrying at least one hydrophilic group or potentially hydrophilic group, d) optionally at least one further compound, different from the monomers (a) to (c), having at least two reactive groups selected from alcoholic hydroxyl groups, primary or secondary amino groups or isocyanate groups, and e) optionally at least one monofunctional compound, different from the monomers (a) to (d), having a reactive group which is an alcoholic hydroxyl group, a primary or secondary amino group or an isocyanate group.

Preferably, the polyurethane adhesive is an anionic polyurethane dispersion adhesive made with low amount of aromatic diisocyanates or no aromatic diisocyanates, e.g. less than 60 mol %, based on the sum of all organic diisocyanates a). The anionic groups of the anionic polyurethane are preferably selected from carboxylate groups and sulfonate groups.

Component b) is composed preferably of $b_1$) 10 to 100 mol %, based on the total amount of component b), of diols having a molecular weight from 500 to 5000 g/mol, $b_2$) 0 to 90 mol %, based on the total amount of component b), of diols having a molecular weight of 60 to less than 500 g/mol.

The ratio of the diols $b_1$) to the monomers $b_2$) is more preferably 0.1:1 to 5:1, more preferably 0.2:1 to 2:1. More particularly the diol b) is selected from polytetrahydrofuran, polypropylene oxide and polyester diols selected from reaction products of dihydric alcohols with dibasic carboxylic acids, and lactone-based polyester diols.

Particular mention may be made as monomers (a) of diisocyanates X(NCO)$_2$, where X is a noncyclic aliphatic hydrocarbon radical having 4 to 15 carbon atoms, a cycloaliphatic or aromatic hydrocarbon radical having 6 to 15 carbon atoms, or an araliphatic hydrocarbon radical having 7 to 15 carbon atoms. Examples of such diisocyanates include tetramethylene diisocyanate, hexamethylene diisocyanate (HDI), dodecamethylene diisocyanate, 1,4-diisocyanatocyclohexane, 1-isocyanato-3,5,5-trimethyl-3-isocyanatomethyl-cyclohexane (IPDI), 2,2-bis(4-isocyanatocyclohexyl)-propane, trimethylhexane diisocyanate, 1,4-diisocyanatobenzene, 2,4-diisocyanatotoluene, 2,6-diisocyanatotoluene (TDI), 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and mixtures of these compounds. Diisocyanates of this kind are available commercially. With particular preference the diisocyanate is selected from the group consisting of hexamethylene diisocyanate, 1-isocyanato-3,5,5-trimethyl-3-isocyanato-methylcyclohexane, 2,6-diisocyanatotoluene, and tetramethylxylylene diisocyanate, or a mixture thereof.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred mixing ratio of the aliphatic to the aromatic isocyanates is 1:9 to 9:1, more particularly 4:1 to 1:4.

The diols (b1) may be polyester polyols, which are known, for example, from Ullmanns Enzyklopädie der technischen Chemie, 4th edition, volume 19, pp. 62 to 65. It is preferred to use polyester polyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyester polyols. The polycarboxylic acids can be aliphatic, cycloaliphatic, araliphatic, aromatic or heterocyclic and can optionally be substituted, by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, and dimeric fatty acids. Preferred dicarboxylic acids are those of the general formula HOOC—(CH$_2$)$_y$—COOH, where y is a number from 1 to 20, preferably an even number from 2 to 20, examples being succinic acid, adipic acid, sebacic acid, and dodecane dicarboxylic acid. Examples of suitable dihydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl) cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, and dibutylene glycol and polybutylene glycols. Preferred alcohols are those of the general formula HO—(CH$_2$)$_x$—OH, where x is a number from 1 to 20, preferably an even number from 2 to 20. Examples of such alcohols are ethylene glycol, butane-1,4-diol, hexane-1,6-diol, octane-1,8-diol, and dodecane-1,12-diol. Preference is also given to neopentyl glycol.

The diols (b1) may also be polycarbonate diols, such as may be obtained, for example, by reacting phosgene with an excess of the low molecular weight alcohols specified as synthesis components for the polyester polyols.

The diols (b1) may also be lactone-based polyester diols, which are homopolymers or copolymers of lactones, preferably hydroxyl-terminated adducts of lactones with suitable difunctional starter molecules. Preferred lactones contemplated are those derived from compounds of the general formula HO—(CH$_2$)$_z$—COOH, where z is a number from 1 to 20 and where one H atom of a methylene unit may also be substituted by a C$_1$ to C$_4$ alkyl radical. Examples are ε-caprolactone, ß-propiolactone, γ-butyrolactone and/or methyl-γ-caprolactone, and mixtures thereof. Examples of suitable starter components are the low molecular weight dihydric alcohols specified above as a synthesis component for the polyester polyols. The corresponding polymers of ε-caprolactone are particularly preferred. Lower polyester diols or polyether diols as well can be used as starters for preparing the lactone polymers. Instead of the polymers of lactones it is also possible to use the corresponding chemically equivalent polycondensates of the hydroxycarboxylic acids corresponding to the lactones.

The diols (b1) may also be polyether diols. Polyether diols are obtainable in particular by polymerizing ethylene oxide, propylene oxide, butylene oxide, tetrahydrofuran, styrene oxide or epichlorohydrin with itself, in the presence of BF$_3$ for example, or by subjecting these compounds, optionally in a mixture or in succession, to addition reaction with starter components containing reactive hydrogen atoms, such as alcohols or amines, examples being water, ethylene glycol, propane-1,2-diol, propane-1,3-diol, 2,2-bis(4-hydroxyphenyl)propane, and aniline. Particular preference is given to polyether diols with a molecular weight of 500 to 5000, and in particular 600 to 4500. A particularly preferred polyether diol is polytetrahydrofuran. Suitable polytetrahydrofurans can be prepared by cationic polymerization of tetrahydrofuran in the presence of acidic catalysts, such as sulfuric acid or fluorosulfuric acid, for example. Preparation processes of this kind are known to the skilled person. Other suitable compounds b1) are α,ω-diaminopolyethers, which are preparable by aminating polyalkylene oxides with ammonia.

Compounds subsumed under $b_1$) include only those polyether diols composed to an extent of less than 20% by weight of ethylene oxide, based on their total weight. Polyether diols with at least 20% by weight of incorporated ethylene oxide units are hydrophilic polyether diols, which are counted as monomers c).

It is also possible to use polyhydroxyolefins, preferably those having 2 terminal hydroxyl groups, e.g., α,ω-dihydroxypolybutadiene, α,ω-dihydroxypolymethacrylic esters or α,ω-dihydroxypoly-acrylic esters, as monomers $b_1$). Such compounds are known for example from EP-A 622 378. Further suitable polyols are polyacetals, polysiloxanes, and alkyd resins.

The hardness and the elasticity modulus of the polyurethanes can be increased by using as diols (b) not only the diols ($b_1$) but also low molecular weight diols ($b_2$) having a molecular weight of from about 60 to 500, preferably from 62 to 200 g/mol.

Monomers ($b_2$) used are in particular the synthesis components of the short-chain alkane diols specified for preparing polyester polyols, preference being given to the unbranched diols having 2 to 12 C atoms and an even number of C atoms, and also to pentane-1,5-diol and neopentyl glycol. Examples of suitable diols $b_2$) include ethylene glycol, propane-1,2-diol, propane-1,3-diol, butane-1,3-diol, butene-1,4-diol, butyne-1,4-diol, pentane-1,5-diol, neopentyl glycol, bis-(hydroxymethyl)cyclohexanes such as 1,4-bis(hydroxymethyl)cyclohexane, 2-methylpropane-1,3-diol, methyl pentane diols, additionally diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is further given to neopentyl glycol.

In order to make the polyurethanes dispersible in water they comprise as synthesis components monomers (c), which carry at least one isocyanate group or at least one group reactive toward isocyanate groups and, furthermore, at least one hydrophilic group or a group which can be converted into a hydrophilic group. In the text below, the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain. The fraction of the components having (potentially) hydrophilic groups among the total quantity of components (a) to (e) is generally such that the molar amount of the (potentially) hydrophilic groups, based on the amount by weight of all monomers (a) to (e), is from 30 to 1000, preferably 50 to 500, and more preferably 80 to 300 mmol/kg. The (potentially) hydrophilic groups can be nonionic or, preferably, (potentially) ionic hydrophilic groups.

Particularly suitable nonionic hydrophilic groups are polyethylene glycol ethers composed of preferably 5 to 100, more preferably 10 to 80 repeating ethylene oxide units. The amount of polyethylene oxide units is generally 0 to 10%, preferably 0 to 6% by weight, based on the amount by weight of all monomers (a) to (e). Preferred monomers containing nonionic hydrophilic groups are polyethylene oxide diols containing at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in U.S. Pat. Nos. 3,905,929 and 3,920,598.

Ionic hydrophilic groups are, in particular, anionic groups such as the sulfonate, the carboxylate, and the phosphate groups in the form of their alkali metal salts or ammonium salts, and also cationic groups such as ammonium groups, especially protonated tertiary amino groups or quaternary ammonium groups. Potentially ionic hydrophilic groups are, in particular, those which can be converted into the above-mentioned ionic hydrophilic groups by simple neutralization, hydrolysis or quaternization reactions, in other words, for example, carboxylic acid groups or tertiary amino groups. (Potentially) ionic monomers (c) are described at length in, for example, Ullmanns Enzyklopadie der technischen Chemie, 4th edition, volume 19, pp. 311-313 and in, for example, DE-A 1 495 745. Acid groups of the polyurethane are neutralized preferably to an extent of at least 10 mol %, more preferably at least 40 mol %, more preferably at least 70 mol %, very preferably at least 90 mol %, and more particularly completely (100 mol %) with a suitable neutralizing agent, and are therefore present in salt form, with the acid group being the anion and with the neutralizing agent being present as cation. Neutralizing agents are, for example, ammonia, alkali metal hydroxides such as NaOH or KOH, or alkanolamines.

Of particular practical importance as (potentially) cationic monomers (c) are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in a conventional manner, for example, by alkoxylating amines containing two hydrogen atoms attached to amine nitrogen, such as methylamine, aniline or N,N'-dimethylhydrazine. Polyethers of this kind generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 C atoms, such as are also described in U.S. Pat. No. 3,412,054. Particular preference is given to compounds of the general formula ($c_1$)

in which $R^1$ and $R^2$ are a $C_1$ to $C_4$ alkanediyl (unit) and $R^3$ is a $C_1$ to $C_4$ alkyl (unit), and especially to dimethylolpropionic acid (DMPA). Also suitable are corresponding dihydroxysulfonic acids and dihydroxyphosphonic acids such as 2,3-dihydroxypropanephosphonic acid. Otherwise suitable are dihydroxyl compounds having a molecular weight of more than 500 to 10 000 g/mol and at least 2 carboxylate groups, which are known from DE-A 39 11 827. They are obtainable by reacting dihydroxyl compounds with tetracarboxylic dianhydrides such as pyromellitic dianhydride or cyclopentanetetracarboxylic dianhydride in a molar ratio of 2:1 to 1.05:1 in a polyaddition reaction. Particularly suitable dihydroxyl compounds are the monomers (b2) cited as chain extenders and also the diols (b1).

Suitable monomers (c) containing amino groups reactive toward isocyanates include aminocarboxylic acids such as lysine, β-alanine or the adducts of aliphatic diprimary diamines with α,β-unsaturated carboxylic or sulfonic acids that are specified in DE-A 20 34 479. Such compounds obey, for example, the formula (c₂)

where $R^4$ and $R^5$ independently of one another are a $C_1$ to $C_6$ alkanediyl unit, preferably ethylene and X is COOH or SO$_3$H. Particularly preferred compounds of the formula (c₂) are N-(2-aminoethyl)-2-aminoethanecarboxylic acid and also N-(2-aminoethyl)-2-aminoethane-sulfonic acid and the corresponding alkali metal salts, with Na being a particularly preferred counterion.

Also particularly preferred are the adducts of the abovementioned aliphatic diprimary diamines with 2-acrylamido-2-methylpropanesulfonic acid, as described for example in DE-B 1 954 090.

Where monomers with potentially ionic groups are used, their conversion into the ionic form may take place before, during or, preferably, after the isocyanate polyaddition, since the ionic monomers do not frequently dissolve well in the reaction mixture. Examples of neutralizing agents include ammonia, NaOH, triethanolamine (TEA), triisopropylamine (TIPA) or morpholine, or its derivatives. The sulfonate or carboxylate groups are more preferably in the form of their salts with an alkali metal ion or ammonium ion as counterion.

The monomers (d), which are different from the monomers (a) to (c) and which may also be constituents of the polyurethane, may serve for crosslinking or chain extension. They may comprise nonphenolic alcohols with a functionality of more than 2, amines having 2 or more primary and/or secondary amino groups, and compounds which as well as one or more alcoholic hydroxyl groups carry one or more primary and/or secondary amino groups. Alcohols having a functionality of more than 2, which may be used in order to set a certain degree of branching or crosslinking, include for example trimethylolpropane, glycerol, or sugars. Compounds (d) are, for example, also isocyanates which as well as free isocyanate groups carry further, masked isocyanate groups, e.g., uretdione groups or carbodiimide groups.

Also suitable are monoalcohols which as well as the hydroxyl group carry a further isocyanate-reactive group, such as monoalcohols having one or more primary and/or secondary amino groups, monoethanolamine for example. Polyamines having 2 or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups.

Amines suitable for this purpose are generally polyfunctional amines of the molar weight range from 32 to 500 g/mol, preferably from 60 to 300 g/mol, which comprise at least two amino groups selected from the group consisting of primary and secondary amino groups. Examples of such amines are diamines such as diaminoethane, diaminopropanes, diaminobutanes, diaminohexanes, piperazine, 2,5-dimethylpiperazine, amino-3-aminomethyl-3,5,5-trimethyl-cyclohexane (isophoronediamine, IPDA), 4,4'-diaminodicyclohexylmethane, 1,4-diaminocyclo-hexane, aminoethyl ethanolamine, hydrazine, hydrazine hydrate or triamines such as diethylenetriamine or 1,8-diamino-4-aminomethyloctane. The amines can also be used in blocked form, e.g., in the form of the corresponding ketimines (see for example CA-A 1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis. It is preferred to use mixtures of diamines and triamines, more preferably mixtures of isophoronediamine (IPDA) and diethylenetriamine (DETA).

The polyurethanes comprise preferably 1 to 30 mol %, more preferably 4 to 25 mol %, based on the total amount of components (b) and (d), of a polyamine having at least 2 isocyanate-reactive amino groups as monomers (d).

For the same purpose it is also possible to use, as monomers (d), isocyanates having a functionality of more than two. Examples of standard commercial compounds are the isocyanurate or the biuret of hexamethylene diisocyanate.

Monomers (e), which are used optionally, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α,α'-dimethylbenzyl isocyanate (TMI) and esters of acrylic or methacrylic acid such as hydroxyethyl acrylate or hydroxyethyl methacrylate.

Within the field of polyurethane chemistry it is general knowledge how the molecular weight (and thus the K value) of polyurethanes can be adjusted by selecting the proportions of the mutually reactive monomers and also the arithmetic mean of the number of reactive functional groups per molecule. Components (a) to (e) and their respective molar amounts are normally chosen so that the ratio A:B, where A) is the molar amount of isocyanate groups and
B) is the sum of the molar amount of the hydroxyl groups and the molar amount of the functional groups which are able to react with isocyanates in an addition reaction, is 0.5:1 to 2:1, preferably 0.8:1 to 1.5:1, more preferably 0.9:1 to 1.2:1. With very particular preference the ratio A:B is as close as possible to 1:1.

The monomers (a) to (e) employed carry on average usually 1.5 to 2.5, preferably 1.9 to 2.1, more preferably 2.0 isocyanate groups and/or functional groups which are able to react with isocyanates in an addition reaction.

The polyaddition of components (a) to (e) for preparing the polyurethane takes place preferably at reaction temperatures of up to 180° C., more preferably up to 150° C., for example from 20 to 180° C., preferably from 70 to 150° C., under atmospheric pressure or under autogenous pressure. The preparation of polyurethanes, and of aqueous polyurethane dispersions, is known to the skilled person. The polyaddition of the synthesis components for the preparation of the polyurethanes, can be catalyzed using organic or organometallic compounds. Suitable catalysts include dibutyltin dilaurate (DBTL), tin(II) octoate, tetrabutoxytitanium (TBOT), or diazabicyclo-[2.2.2]octane. Other suitable catalysts are salts of cesium, especially cesium carboxylates such as, for example, the formate, acetate, propionate, hexanoate, or 2-ethylhexanoate of cesium.

An aqueous polyurethane dispersion for the purposes of the present invention is a dispersion which has an aqueous solvent as a continuous phase. Suitable aqueous solvents are water and mixtures of water with water-miscible solvents, examples being alcohols, such as methanol, ethanol, n-propanol, isopropanol, n-butanol, sec-butanol, tert-butanol, n-hexanol and cyclo-hexanol; glycols, such as ethylene glycol, propylene glycol, and butylene glycol; the methyl or ethyl ethers of the dihydric alcohols, diethylene glycol, triethylene glycol, polyethylene glycols having number-average molecular weights of up to about 3000, glycerol and dioxane and also ketones, such as acetone in particular. Preferably the polyurethane dispersion is substantially free from organic solvents. By "substantially free from organic solvents" here is meant that the fraction of organic solvents is not more than 5% by weight, more preferably not more than 1% by weight, more particularly not more than 0.1% by weight, based on the total weight of the solvent.

Preferably the polyurethanes are prepared in the presence of at least one organic solvent. Preferred organic solvents for preparing the polyurethanes are ketones, such as acetone and methyl ethyl ketone, and also N-methylpyrrolidone. Acetone is used with particular preference. Where an at least partly water-miscible solvent is used for preparing the polyurethanes, the polyurethane dispersion of the invention may comprise, in addition to water, the organic solvent used for the preparation. It will be appreciated that the polyurethane dispersions of the invention can be prepared in the presence of at least one organic solvent which is subsequently replaced in whole or in part by water.

The polyurethane dispersions may be prepared for example by one of the following processes: According to the "acetone process", an ionic polyurethane is prepared from the synthesis components in a solvent which is miscible with water and which boils below 100° C. under atmospheric pressure. Sufficient water is added to form a dispersion in which water represents the coherent phase. The "prepolymer mixing process" differs from the acetone process in that, rather than a fully reacted (potentially) ionic polyurethane, a prepolymer is first of all prepared that carries isocyanate groups. The components in this case are selected such that the as-defined ratio A:B is greater than 1.0 and up to 3, preferably from 1.05 to 1.5. The prepolymer is first dispersed in water and then optionally crosslinked by reaction of the isocyanate groups with amines which carry more than 2 isocyanate-reactive amino groups, or chain extended by reaction of the isocyanate groups with amines which carry 2 isocyanate-reactive amino groups.

Chain extension also takes place when no amine is added. In that case, isocyanate groups are hydrolyzed to amino groups, which are consumed by reaction with remaining isocyanate groups in the prepolymers, with chain extension. Customarily, if a solvent has also been used during the preparation of the polyurethane, the major portion of the solvent is removed from the dispersion, by means of distillation under reduced pressure, for example, The dispersions preferably have a solvent content of less than 10 weight % and with particular preference are free from solvents. Solvents are understood to mean organic solvents.

Preferred aqueous adhesive dispersions comprise at least one dispersed polyurethane constructed from
a) at least one organic diisocyanate, selected from diisocyanates of the formula $X(NCO)_2$, where X is a non-cyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms,
b) at least one dihydroxy compound selected from polyester diols and polyether diols, the polyester diols being formed from at least one aliphatic dicarboxylic acid and at least one alkanediol, and the polyetherdiols being selected from polypropylene oxide and polytetrahydrofuran,
c) at least one compound having at least one group reactive toward isocyanate groups, and additionally carrying at least one ionic group or one group which can be converted into an ionic group,
d) optionally further compounds different from a) to c).

The polyurethane preferably consists to an extent of at least 50 weight %, more preferably at least 80 weight %, very preferably at least 90 weight % or 100 weight % of compounds a) to c). The amount of compounds (d) and (e) is preferably less than 10 weight %, more preferably less than 5 or 2 weight %, very preferably less than 1 weight %, based in each case on the sum total of all polyurethane synthesis components. In one preferred embodiment the polyurethane is synthesized exclusively from the compounds (a) to (c).

For sustainability reasons it is preferred to use bio-based materials for producing the polyurethane adhesives. The term "bio-based" indicates that the material is of biological origin and comes from a biomaterial/renewable resources. A material of renewable origin or biomaterial is an organic material wherein the carbon comes from the $CO_2$ fixed recently (on a human scale) by photosynthesis from the atmosphere. A biomaterial (carbon of 100% natural origin) has an isotopic ratio $^{14}C/^{12}C$ greater than $10^{-12}$, typically about $1.2 \times 10^{-12}$, while a fossil material has a zero ratio. Indeed, the isotopic $^{14}C$ is formed in the atmosphere and is then integrated via photosynthesis, according to a time scale of a few tens of years at most. The half-life of the $^{14}C$ is 5,730 years. Thus, the materials coming from photosynthesis, namely plants in general, necessarily have a maximum content in isotope $^{14}C$. The determination of the content of biomaterial or of bio-carbon can be carried out in accordance with the standards ASTM D 6866-12, the method B (ASTM D 6866-06) and ASTM D 7026 (ASTM D 7026-04). The polyurethane adhesive preferably consists to an extent of at least 5 weight %, more preferably at least 10 weight % of bio-based materials, based on the sum total of all polyurethane adhesive synthesis components.

Suitable bio-based materials for producing polyurethanes are for example alcohols (in particular diols and polyols) and organic acids (in particular diacids) derived from natural materials such as starch, saccharose, glucose, lignocellulose, natural rubber or plant oils. Suitable alcohols and organic acids derived from natural materials are for example ethanol, monoethylene glycol, polyethylene glycol, isosorbide, 1,3-propanediol, 1,4-butanediol, glycerol, adipic acid or succinic acid. Preferably at least part of the polyurethane is made of bio-based materials.

For sustainability reasons it is preferred to use recycled raw materials for producing the polyurethane adhesives. Polyurethanes can be found in many products, for example, in soft foams (mattresses, sponges, upholstered furniture), hard foams (insulation materials, building materials), thermoplastics (sports shoes), coatings (varnishes, paints) or adhesives. There is a need for sustainable recycling of polyurethane waste, which allows the building blocks of polyurethane polymers to be reused. To do this, the bonds in the polyurethanes are split in order to be able to obtain defined degradation products and thus make them recyclable and reusable in the production of new polyurethanes. The polyurethane adhesive preferably consists to an extent of at least 5 weight %, more preferably at least 10 weight % of recycled materials, based on the sum total of all polyurethane adhesive synthesis components. One method of recycling of polyurethanes is thermal recycling. This process takes place at high temperatures, as well as with the use of catalysts to recover monomers or building blocks. For example, thermal glycolysis, which is currently the most common chemolysis for recycling of polyurethanes has already been implemented industrially. It allows the recovery of polyols. DE 102004014165 describes a method for the production of polyols from waste polyurethane by reacting a mixture of waste polyurethane, glycols or oligo-ester mixture (from polyester production) and primary and/or secondary aliphatic amines. EP 0733669 A2 describes a method for the utilisation of plastic waste containing mixtures of polyurethanes and other plastics, comprising (a) reacting the waste with a mixture of low-molecular weight, at least difunctional alcohols (I) and polyether-polyol(s) (II), and (b) separating the polyol glycolysis products from the rest of the waste by mechanical methods. The glycolysis polyols obtained by this process can be used to manufacture new polyurethanes. Low-amine glycolysis products from polyurethane waste is preferably used as the recycled polyol. For economic reasons, preferably at least 5% by weight, more preferably at least 10% by weight, of recycled polyol, based on the total amount of isocyanate-reactive compounds are used for producing new polyurethanes.

The recycled polyols can be obtained by glycolysis of polyurethane waste with short-chain, hydroxyl-containing compounds, such as for example ethylene oxide-propylene oxide copolymers, OH-functionalized polybutadienes), ethylene glycol, diethylene glycol, triethylene glycol, tetraethylene glycol, oligoethylene glycols, propylene glycol, dipropylene glycol, tripropylene glycol, oligopropylene glycols, ethylene oxide-propylene oxide copolymers, butanediol, OH-functionalized polybutadienes, neopentyl glycol, glycerol, diethanolamine and triethanolamine, optionally obtained in the presence of organometallic catalysts at higher temperatures. Non-enzymatic hydrolysis at high temperature and high pressures allows recovery of both polyols and amines as re-usable products.

Another method is enzymatic degradation of polyurethanes into defined monomers which can be reused for production of new polyurethanes, for example by urethanases as described in WO 2019/243293. The recycled raw materials from enzymatic degradation for producing new polyurethanes preferably are low molecular weight degradation products, preferably of polyester-based polyurethanes, preferably with a molecular weight of at most 1,000 g/mol.

Suitable recycled raw materials are for example
(i) polyols and polycarboxylic acids which were used to synthesize the polyester polyols used for the synthesis of the polyurethane in question; and
(ii) amines which are derived from the isocyanates used in the production of the polyurethane in question, for example in the case of 2,4-tolylene diisocyanate, 2,4-tolylene diamine.

A "polyol" is understood to mean any compound having at least two hydroxyl groups.

Said low molecular weight polyol preferably has a molecular weight of at most 300 g/mol. Preferred recycled low molecular weight polyols are selected from the group consisting of ethylene glycol, diethylene glycol, triethylene glycol, propylene glycol, 1,2-di-propylene glycol, neopentyl glycol, glycerol, 1,1,1-trimethylolpropane, sucrose, sorbitol and pentaerythritol.

A "polycarboxylic acid" is understood to mean any compound which contains at least two carboxyl groups. Said low molecular weight polycarboxylic acid preferably has a molecular weight of at most 300 g/mol. Preferred recycled low molecular weight polycarboxylic acids, are selected from the group consisting of succinic acid, glutaric acid, adipic acid, phthalic acid, terephthalic acid, benzenetricarboxylic acid, oleic acid and ricinoleic acid.

A "polyamine" is understood to mean any compound which contains at least two amino groups. Said low molecular weight polyamine preferably has a molecular weight of at most 300 g/mol. Preferred low molecular weight recycled polyamines, are selected from the group consisting of 4,4'-methylenediamine, 2,4'-methylenediamine, 2,2'-methylenediamine, 2,4-tolylenediamine, 2,6-tolylenediamine, hexamethylenediamine, isophoronediamine, xylylenediamine, penta-methylenediamine, para-phenylenediamine, butylenediamine and H12-methylenediamine. The polyamines are particularly preferably selected from the group consisting of 4,4'-methylenediamine, 2,4'-methylenediamine, 2,2'-methylenediamine, 2,4-tolylenediamine and 2,6-tolylenediamine.

The aqueous polyurethane dispersions preferably have a solids content of 10 to 70, preferably of 30 to 55, weight %.

A preferred aqueous adhesive polyurethane dispersion comprises a polyurethane which is characterized
  by a K value of from 45 to 100, preferably from 50 to 90 measured as 1 wt. % solution in DMF at 25° C.; by a melting point of from 40 to 70° C.;
  by a glass transition temperature of less than −10° C., measured by differential scanning calorimetry as the midpoint temperature of the second heating curve at a heating rate of 20 K/min,
  and the dispersed polyurethane is constructed from
  a) at least one organic diisocyanate, selected from diisocyanates of the formula $X(NCO)_2$, where X is a non-cyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms, wherein the amount of aromatic diisocyanates is less than 60 mol %, based on the sum of all organic diisocyanates a),
  b) at least one dihydroxy compound selected from the group consisting of polyesterdiols and polytetrahydrofuran,
  c) at least one compound having at least one group reactive toward isocyanate groups, and additionally carrying at least one ionic group or one group which can be converted into an ionic group, wherein the compounds c) preferably contain a group selected from carboxylate groups and sulfonate groups,
  d) optionally further compounds different from a) to c);
  wherein the polyurethane adhesive optionally contains at least one additive selected from the group consisting of ionic surfactants, nonionic surfactants, rheology modifiers, fillers, plasticizers, stabilizers against hydrolytic degradation and biocides.

Glass transition temperatures are determined by Differential Scanning calorimetry (ASTM D 3418-08, "midpoint temperature" of second heating curve, heating rate 20 K/min).

PU Hotmelt

A hotmelt polyurethane adhesive is solid at room temperature, solvent-free and meltable above room temperature. The hotmelt polyurethane adhesive is an unreactive thermoplast. Bonding is achieved by physical softening at elevated temperatures and re-crystallization on cooling. Solvent inherent in the preparation process is removed beforehand by suitable methods, preferably down to a residual level of less than 0.5% by weight, based on the polymer. To produce adhesive coatings, the hotmelts can be applied as a melt at temperatures from preferably 80 to 160° C. to the materials to be coated, the coated surface being coated at least partly with the hotmelt polyurethane adhesive.

For polyurethane (PU) hotmelt adhesives, the melting point of the PU and the recrystallization or solidification time (the amount of time for the PU to fully crystalize or solidify after melting) are important features. PUs with higher melting points provide adhesives having better heat resistance, abrasion resistance, and resilience over PUs with lower melting points. In addition, the recrystallization time is important because it determines the amount of time required for processing in the manufacture of articles. The melting point measured by dynamic mechanical analysis (DMA) of a hot-melt adhesive comprising a thermoplastic polyurethane is preferably from about 80° C. to about 160° C., or from about 80° C. to about 130° C., for example, from about 90° C. to about 130° C., further for example, from about 110° C. to about 125° C., and further for example, from about 110° C. to about 115° C. The recrystallization time is defined as the amount of time between the peak of melting for the PU hot-melt adhesive and the peak of recrystallization as measured by differential scanning calorimetry (DSC) methods. The recrystallization time of a hot-melt adhesive comprising a PU as described herein is preferably 5 minutes or less, for example, 4 minutes or less, further for example, 3 minutes or less.

The application amount of the PU hotmelt adhesive is preferably from 10 g/m² to 400 g/m², more preferred from 20 to 200 g/m², particularly preferred from 50 to 150 g/m².

Hot-melt adhesives (HMA) are adhesive systems which are solid at room temperature, become tacky or sticky upon heating and melt to a liquid or fluid state. They typically solidify rapidly upon cooling at ambient temperatures to develop internal strength and cohesion. Hotmelt adhesives are one-part, solvent free thermoplastic adhesives which are characterized by low to medium viscosity when applied at the required dispensing temperature. Once applied, hotmelt adhesives cool and solidify to form a strong bond between articles. Bonds formed with thermoplastic hot-melt adhesives are reversible. Under sufficiently high thermal stress, thermoplastic hot-melt adhesives will liquefy and lose their cohesive strength.

Suitable hotmelt polyurethanes comprise the reaction product of a) a polyisocyanate component, b) a polyol component, and c) optionally a chain extender component. The reaction may or may not be carried out in the presence of a catalyst. The isocyanate component of the HMA may comprise one or more polyisocyanates. In some useful embodiments, the polyisocyanate component includes one or more diisocyanates. Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates. In some embodiments, mixtures of aliphatic and aromatic diisocyanates may be useful. Examples of useful polyisocyanates include aromatic diisocyanates such as 4,4'-methylenebis(phenyl isocyanate) (MDI), 1,6-hexamethylene diisocyanate (HDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (IPDI), 3,3'-dimethyl-4,4'-biphenylene diisocyanate (TODD, 1,5-naphthalene diisocyanate (NDI), and dicyclohexylmethane-4,4'-diisocyanate (H12MDI). Isomers of these diisocyanates may also be useful. Mixtures of two or more polyisocyanates may be used. In some embodiments, the polyisocyanate is MDI and/or H12MDI. In some embodiments, the polyisocyanate consists essentially of MDI. In some embodiments, the polyisocyanate consists essentially of H12MDI.

The hotmelt polyurethanes are also made using b) a polyol component. Polyols, which may also be described as hydroxyl terminated intermediates, useful in the present invention include polyester polyols, polyether polyols, and combinations thereof. The polyester polyols preferably are linear polyesters. Hydroxyl terminated polymeric intermediates having a number average molecular weight (Mn) of preferably from about 500 to about 10,000, for example, about 3,000 to about 6,000 Daltons, further for example about 4,000 to about 6,000 Daltons. The molecular weight is determined by assay of the terminal functional groups and is related to the number average molecular weight.

The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, isophthalic, terephthalic, cyclohexane dicarboxylic, and the like. Anhydrides of the above dicarboxylic acids such as phthalic anhydride, tetrahydrophthalic anhydride, or the like, can also be used. The glycols which are reacted to form a desirable polyester intermediate can be aliphatic, aromatic, or combinations thereof, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable hydroxyl terminated polyether intermediates include polyether polyols derived from a diol or polyol having a total of from 2 to 15 carbon atoms. In some embodiments, the hydroxyl terminated polyether is an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly (ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran which can be described as polymerized tetrahydrofuran, and which is commonly referred to as PTMEG.

The hotmelt polyurethanes described herein are made using optionally c) a chain extender component. Suitable chain extenders include low molecular weight diols (molecular weight less than 500), diamines, and combination thereof. Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentyl glycol, 1,4-cyclohexanedimethanol (CHDM), 2,2-bis[4-(2-hydroxyethoxy)phenylpropane (HEPP), hexamethylenediol, heptanediol, nonanediol, dodecane-diol, 3-methyl-1,5-pentanediol, ethylenediamine, butanediamine, hexamethylenediamine, and hydroxyethyl resorcinol (HER), and the like, as well as mixtures thereof. In some embodiments the chain extender includes BDO, HDO, 3-methyl-1,5-pentanediol, or a combination thereof. In some embodiments, the chain extender includes BDO. Other glycols, such as aromatic glycols could be used. In some embodiments, the composition is formed using only less than 8% by weight, for example, less than 5%, further for example, less than 4%, even further for example, less than 3%, further for example, less than 2%, further for example, less than 1%, and even further for example, less than 0.5% by weight of the total reactants of a chain extender. In some embodiments, the hotmelt polyurethanes are essentially free of or even completely free of chain extender.

Optionally, one or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous octoate, stannous dilaurate, bismuth compounds, e.g. bismuth trineodecanoate, or the dialkyltin salts of aliphatic carboxylic acids, e.g. dibutyltin diacetate, dibutyltin dilaurate, or the like. The amounts usually used of the catalysts are from 0.001 to 0.1 part by weight per 100 parts by weight of polyol component. In some embodiments, the reaction to form the hotmelt PU of the present invention is substantially free of or completely free of catalyst.

Various types of optional components can be present during the polymerization reaction, and/or incorporated into the hotmelt PU adhesive composition described above to improve processing and other properties. These additives include but are not limited to antioxidants, such as phenolic types, rheology modifiers, such as hydrophobic or hydrophilic fumed silica, and adhesion promoters, such as malonic acid, fumaric acid, chlorinated rubber, vinyl chloride/vinyl acetate copolymers, vinyl chloride/vinyl acetate/maleic acid terpolymers. Other additives may be used to enhance the performance of the hotmelt PU adhesive composition or blended product, such as other resins, including but not limited to coumarone-indene or terpene-phenolic which may help increase the tackiness of the hot-melt adhesive when hot and slow the recrystallization time. All of the additives described above may be used in an effective amount customary for these substances. These additional additives can be incorporated into the components of, or into the reaction mixture for, the preparation of the hotmelt PU resin, or after making the hotmelt PU resin. In another process, all the materials can be mixed with the hotmelt PU resin and then melted or they can be incorporated directly into the melt of the hotmelt PU resin.

The hotmelt PU can be manufactured by any means known to those of ordinary skill in the art. For example, the components: (a) the diisocyanate component, (b) the polyol component, and (c) the optional chain extender component are reacted together to form the hotmelt PU useful in this invention. Any known processes to react the reactants may be used to make the hotmelt PU. In one embodiment, the process is a so-called "one-shot" process where all the reactants are added to an extruder reactor and reacted. The equivalent weight amount of the diisocyanate to the total equivalent weight amount of the hydroxyl containing components, that is, the polyol intermediate and, if included, the chain extender glycol, can be from about 0.5 to about 1.10, or, from about 0.5 to about 1.0, or from about 0.5 to about 0.90. Reaction temperatures utilizing a urethane catalyst can be from about 175 to about 245° C. preferably from 180 to 220° C.

As another example, the hotmelt PU can also be prepared utilizing a pre-polymer process. In the pre-polymer route, the polyol component is reacted with generally an equivalent excess of one or more diisocyanates to form a pre-polymer solution having free or unreacted diisocyanate therein. The reaction is generally carried out at temperatures of from about 80 to about 220° C., or from about 150 to about 200° C. in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about can be from about 0.5 to about 1.10, or, from about 0.5 to about 1.0, or from about 0.5 to about 0.90. The chain extension reaction temperature is preferably from about 180 to about 250° C. or from about 200 to about 240° C. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25. In one embodiment, the ingredients are mixed on a single or twin screw extruder with multiple heat zones and multiple feed ports between its feed end and its die end. The ingredients may be added at one or more of the feed ports and the resulting PU composition that exits the die end of the extruder may be pelletized.

The described process for preparing the hotmelt PU includes both the "pre-polymer" process and the "one-shot" process, in either a batch or continuous manner. That is, in some embodiments the hotmelt PU may be made by reacting the components together in a "one shot" polymerization process wherein all of the components, including reactants are added together simultaneously or substantially simultaneously to a heated extruder and reacted to form the hotmelt PU. While in other embodiments the hotmelt PU may be made by first reacting the polyisocyanate component with some portion of the polyol component forming a prepolymer, and then completing the reaction by reacting the pre-polymer with the remaining reactants, resulting in the hotmelt PU. After exiting the extruder, the composition may be pelletized and stored in moisture proof packaging and is ultimately sold in pellet form; or could be extruded directly from the reaction extruder through a die into a final product profile.

In a useful embodiment of the present invention, the hotmelt PU is highly crystalline, for example, more than 80% crystalline, further for example, more than 90% crystalline. In an embodiment, the crystals in the hotmelt PU composition are formed by the polyol component, for example, the polyester component.

The application of aqueous polyurethane dispersion adhesive preferably occurs by brushing, spray, doctor blade coating, print or roll coating, followed by a drying step. The adhesive can be applied for example using an automated or machine assisted process, e.g. using an automatic sprayer. Adhesives are coated on one or preferable both substrates. Slowly crystallizing polyurethane types stay activated after the drying tunnel and the bond is formed directly thereafter. Fast crystallizing polyurethane types are reactivated by heating up to 50 to 100° C. by air or infrared radiation before bond formation. The amount of aqueous polyurethane dispersion adhesive is preferably from 10 g/m$^2$ to 400 g/m$^2$ (solid), more preferred from 20 to 200 g/m$^2$, particularly preferred from 50 to 150 g/m$^2$. Hotmelt polyurethane adhesives are preferably applied in the molten state or as prefabricated films between the substrates.

The methods of bonding the first component to the second component can include various surface treatments of the first component, the second component or both, commonly applied with adhesives. The methods of bonding may include treating one or both of the surface of the first component and the surface of the second component prior to applying the polyurethane adhesive. The treating step can include a surface treatment such as a physical treatment, a chemical treatment, a solvent treatment, or any combination thereof. Physical treatments can include treating a surface with an abrasive to increase a surface roughness. Chemical treatments can include etching a surface with acid. Solvent treatments can include contacting a surface with a solvent to remove contaminants from the surface. Preferably, the treating step does not include a primer treatment (i.e. coating with a primer solution before application of the adhesive).

The methods of bonding the first component to the second component can include applying pressure to ensure a proper level of bonding between the components. For example, the bonding methods can include applying pressure to the first component and the second component for a period of time to adhesively bond the first component and the second component. The pressure can be for example from about 2000 kPa to about 5500 kPa and the period of time can be from about 10 minutes to about 30 minutes. The methods of bonding can further include applying of heat to adhesively bond the first component and the second component.

Method of Debonding

The at least two components of the bonded article are debonded by treatment with an aqueous surfactant composition at a temperature from 60° C. to 130° C., preferably from 60 to 100° C. or from 70 to 100° C., and at a pH of 4 to 12, preferably from 6 to 10. If necessary, the bonded article is cut into smaller pieces before debonding. Debonding occurs after treatment of the bonded article (or of pieces thereof) with an aqueous surfactant solution at pH values from 4 to 12 and temperatures from 60° C. to 130° C. for preferably from 2 to 120 minutes. A preferred method of debonding is a treatment with an aqueous surfactant composition characterized by soaking pieces of the bonded articles in aqueous solutions of surfactants at a pH of from 6 to 10, and temperatures from 60° C. to 100° C. for up to 60 min while stirring or shaking.

It was found that debonding by a washing process is particularly convenient if the polyurethane adhesives are not crosslinked or at least not fully crosslinked; so that they are completely soluble without residual gel in polar organic solvents like N-methyl pyrrolidone (NMP), dimethylformamide (DMF), dimethylacetamide (DMAC). Most preferred are water-based adhesives, i.e. aqueous polyurethane dispersion adhesives.

A preferred method of debonding comprises treatment of the bonded articles or parts thereof at a temperature of 60 to 100° C. at a pH of from 7 to 9 for a time of from 2 to 60 minutes with an aqueous surfactant compositions comprising from 0.1 to 80 wt. % of at least one surfactant in water, wherein the surfactant is selected from the group consisting of anionic and nonionic surfactants, and optional further additives selected from the group consisting of defoamers, solvents, and bases.

Preferably no residual adhesive remains on the surfaces of the debonded thermoplastic polymer. This has the advantage that residual adhesive does not interfere in the recycling of the debonded thermoplastic polymer.

Preferably, the bonded article is resistant to debonding at temperatures up to 60° C. (without treatment with water, aqueous surfactant composition or any other washing composition) and resistant to debonding by treatment with aqueous surfactant compositions at temperatures up to 40° C. Debonding tests with washing compositions are done by soaking pieces of bonded objects in aqueous solutions of surfactants at pH 6-10 and at the respective temperature (e.g. 40° C.) for up to 60 min, while stirring or shaking. Further details of debonding tests are described in the examples.

Washing Liquid Composition

De-bonding with aqueous compositions is significantly shorter due to the surfactants compared to pure or demineralized water. Surfactant compositions and surfactant combinations for preparing the washing liquid composition are described for example in U.S. Pat. No. 5,030,378, WO 2003/064582, WO 2011/060028 and WO 2008/074635

A preferred aqueous surfactant composition is a highly alkaline cleaner compositions containing phosphates, anionic surfactants and amphoteric surfactants and having a pH of from 10 to 12. An example is Mucasol® of Schûlke.

A suitable example of an aqueous surfactant composition is an aqueous composition comprising
 (a) from about 0.05 to about 25 wt. %, preferably from about 0.1 to about 10 wt. % of anionic surfactant,
 (b) from about 0.05 to about 25 wt. %, preferably from about 0.1 to about 10 wt. % of non-ionic surfactant,
 (c) and water.

The surfactant of the aqueous surfactant composition can be a single surfactant or a mixture of two or more surfactants. In general any surfactant may be used, including anionic, non-ionic, cationic, amphoteric and zwitterionic surfactants. Preferably the surfactant is anionic, non-ionic or a mixture of the two. The surfactant is preferably a detersive surfactant. By this, we mean that the surfactant, or at least one surfactant of any surfactant mixture, provides a detersive, i.e. cleaning effect to textile fabrics treated as part of a laundering process. Other surfactants, which may or may not be detersive surfactants can be used as part of the composition. It is preferred that the surfactant chosen is an anionic surfactant, a non-ionic surfactant or a mixture of one or more anionic surfactants with one or more non-ionic surfactants.

The anionic surfactants used in this invention can be any water soluble anionic surfactant. "Water soluble" surfactants are, unless otherwise noted, here defined to include surfactants which are soluble or dispersible to at least the extent of 0.01% by weight in distilled water at 25° C. "Anionic surfactants" are defined herein as amphiphilic molecules comprising one or more functional groups that exhibit a net anionic charge when in aqueous solution at the normal wash pH of between 6 and 11.

Preferred anionic surfactants are the alkali metal, ammonium, or alkylolammonium (e.g., mono-ethanolammonium or triethanolammonium) salts of organic sulfur reaction products having in their molecular structure an alkyl radical containing from about 6 to 24, preferably 10 to 20 carbon atoms and a sulfonic acid or sulfuric acid ester group.

Included in the term "alkyl" is the alkyl portion of aryl groups. Examples of this group of synthetic surfactants are the alkyl sulfates, especially those obtained by sulfating the higher alcohols (C8-C18 carbon atoms) such as those produced by reducing the glycerides of tallow or coconut oil; and the alkylbenzene sulfonates in which the alkyl group contains from about 9 to about 15 carbon atoms, in straight chain or branched chain configuration. Especially valuable are linear straight chain alkylbenzene sulfonates in which the average number of carbon atoms in the alkyl group is from about 11 to 14. Other anionic surfactants herein are the water-soluble salts of: paraffin sulfonates containing from about 8 to about 24 (preferably about 12 to 18) carbon atoms; alkyl glyceryl ether sulfonates, especially those ethers of C8-18 alcohols (e.g., those derived from tallow and coconut oil); alkyl phenol ethylene oxide ether sulfates containing from about 1 to about 4 units of ethylene oxide per molecule and from about 8 to about 12 carbon atoms in the alkyl group; and alkyl ethylene oxide ether sulfates containing about 1 to about 4 units of ethylene oxide per molecule and from about 10 to about 20 carbon atoms in the alkyl group. Other useful anionic surfactants include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

Although any anionic surfactant hereinafter described can be used, highly preferred anionic surfactants are the alkali and alkaline earth metal salts of fatty alcohol sulphates, preferably primary alkyl sulfates, more preferably they are ethoxylated, for example alkyl ether sulfates, and alkyl benzene sulfonates or mixtures thereof.

Preferred anionic surfactants are alkyl ether sulfates of the general formula: $R—(OCH_2CH_2)_x—O—SO_3M$ wherein R is a petroleum derived or non-petroleum derived fatty alcohol with even number of carbon chain lengths of from about C8 to about C20, preferably from C8 to C18, and wherein x is from about 0.5 to about 8, preferably from 2 to 5, and where M is a solubilizing ion, preferably alkali metal or ammonium cation. The alkyl group R may have a mixture of chain lengths. It is preferred that at least two-thirds of the R alkyl groups have a chain length of 8 to 14 carbon atoms. This will be the case if R is coconut alkyl, for example.

Preferred anionic surfactants are for example primary alkyl sulfates of formula $R^{12}OSO_3M$ where $R^{12}$ is a primary alkyl group of 8 to 18, preferably 10 to 18 carbon atoms and M is a solubilizing cation. The alkyl group $R^{12}$ may have a mixture of chain lengths. It is preferred that at least two-thirds of the $R^{12}$ alkyl groups have a chain length of 8 to 14 carbon atoms. This will be the case if $R^{12}$ is coconut alkyl, for example. The solubilizing cation may be a range of cations which are in general monovalent and confer water solubility. An alkali metal, notably sodium, is especially envisaged. Other possibilities are ammonium and substituted ammonium ions, such as trialkanolammonium or trialkylammonium.

Further preferred anionic surfactants are alpha-sulfonated fatty acid esters of general formula: $R^3—CH(SO_3M)-CO_2R^4$ wherein $R^3$ is a petroleum derived or non-petroleum derived C6-C20, preferably C8-C16 carbon chain, preferably alkyl; $R^4$ is an alkyl group of 1 to 4, preferably 1 to 2 carbon atoms, and M is a solubilizing cation preferably selected from the group consisting of sodium, potassium, magnesium, and ammonium cations, and mixtures thereof. The group $R^3$ may have a mixture of chain lengths. Preferably at least two-thirds of these groups have 6 to 12 carbon atoms. This will be the case when the moiety $R^3CHCO2-$ is derived from a coconut source, for instance. It is preferred that $R^4$ is a straight chain alkyl, notably methyl or ethyl.

Further preferred anionic surfactants are alkyl benzene sulfonates of general formula $R^6ArSO_3M$ where $R^6$ is an alkyl group of 8 to 18 carbon atoms, Ar is a benzene ring (C6H4) and M is a solubilizing cation. The group $R^6$ may be a mixture of chain lengths. A mixture of isomers is typically used, and a number of different grades, such as "high 2-phenyl" and "low 2-phenyl" are commercially available for use depending on formulation needs. Typically they are produced by the sulphonation of alkylbenzenes, which can be produced by either the HF-catalyzed alkylation of benzene with olefins or an AlCl3-catalyzed process that alkylates benzene with chlor-paraffins. Straight chains of 11 to 14 carbon atoms are usually preferred.

Further preferred anionic surfactants are paraffin sulphonates and olefin sulphonates, each having 8 to 22 carbon atoms, preferably 12 to 16 carbon atoms. They are usually produced by the sulphoxidation of petrochemically-derived normal paraffins or olefins.

Further preferred anionic surfactants are sulfosuccinate esters of formula

$R^7$ and $R^8$ are alkyl groups with chain lengths of between 2 and 16 carbons, and may be linear or branched, saturated or unsaturated. A preferred sulphosuccinate is sodium bis (2-ethylhexyl) sulphosuccinate.

Further preferred anionic surfactants are organic phosphate esters such as complex mono- or diester phosphates of hydroxyl-terminated alkoxide condensates, or salts thereof. Included in the organic phosphate esters are phosphate ester derivatives of polyoxyalkylated alkylaryl phosphate esters of ethoxylated linear alcohols and ethoxylates of phenol. Also included are non-ionic alkoxylates having a sodium alkylene carboxylate moiety linked to a terminal hydroxyl group of the non-ionic through an ether bond. Counterions to the salts of all the foregoing may be those of alkali metal, alkaline earth metal, ammonium, alkanolammonium and alkyl-ammonium types.

Further preferred anionic surfactants are carboxylic acid salts of formula $R^{13}COOM$ where $R^{13}$ is a primary or secondary alkyl group of 3 to 29 carbon atoms and M is a solubilizing cation. The alkyl group represented by $R^{13}$ may represent a mixture of chain lengths and may be saturated or unsaturated, although it is preferred that at least two thirds of the $R^{13}$ groups have a chain length of between 7 and 17 carbon atoms. Non-limiting examples of suitable alkyl group sources include the fatty acids derived from coconut oil, tallow, tall oil and palm kernel oil. For the purposes of minimizing odor, however, it is often desirable to use primarily saturated carboxylic acids. The solubilizing cation M may be any cation that confers water solubility to the product, although monovalent such moieties are generally preferred. Examples of acceptable solubilizing cations for use with this invention include alkali metals such as sodium and potassium, which are particularly preferred, and amines such as triethanolammonium, ammonium and morpholinium. Preferred fatty acid soaps are selected from the group consisting of sodium salts of saturated carboxylic acids with preferably 12 to 18 carbon atoms, sodium salts of unsaturated carboxylic acids with preferably 12 to 18 carbon atoms, potassium salts of saturated carboxylic acids with preferably 12 to 18 carbon atoms, potassium salts of unsaturated carboxylic acids with preferably 14 to 18 carbon atoms, and mixtures thereof.

Other preferred anionic surfactants include isothionates, sulphated triglycerides, alcohol sulphates, lignin sulphonates, naphthalene sulphonates and alkyl naphthalene sulphonates and the like.

The surfactant compositions herein can optionally contain other synthetic or natural surfactants known in the art, such as the nonionic, cationic, zwitterionic, and ampholytic surfactants. Preferred nonionic surfactants are selected from alkyl polyglycosides and highly ethoxylated alcohol non-ionic surfactants having an average degree of ethoxylation of from 15 to 40, preferably from 10 to 30.

Preferred non-ionic surfactants are the following:

For the purposes of this disclosure, "non-ionic surfactant" shall be defined as amphiphilic molecules with a molecular weight of less than about 10,000, unless otherwise noted, which are substantially free of any functional groups that exhibit a net charge at the normal wash pH of 6-11. Any type of non-ionic surfactant may be used, although preferred materials are further discussed below. Highly preferred are fatty acid alkoxylates, especially ethoxylates, having an alkyl chain of from C8-C35, preferably C8-C30, more preferably C10-C24, especially C10-C18 carbon atoms.

Fatty Alcohol Ethoxylates

A preferred nonionic surfactant is an ethoxylated nonionic surfactant of the formula $R^1-(OC_2H_4)_n-OH$, wherein $R_1$ is a petroleum-derived or non-petroleum derived C10-C16 alkyl group or a C8-C12 alkyl phenyl group, n is from about 0.5 to about 20, preferably from 3 to 9, and said nonionic surfactant has an HLB (hydrophile-lipophile balance) preferably from about 6 to about 14, preferably from about 10 to about 13. Particularly preferred are condensation products of C12-C15 alcohols with from about 3 to about 8 moles of ethylene oxide per mole of alcohol, e.g., C12-C13 alcohol condensed with about 6.5 moles of ethylene oxide per mole of alcohol. $R^1$ may be linear or branched. Such chemicals are generally produced by oligomerizing fatty alcohols with ethylene oxide in the presence of an effective amount catalyst. The fatty alcohol starting materials can be derived from natural or synthetic sources or a combination thereof. Commercial alcohol ethoxylates are typically mixtures, comprising varying chain lengths of $R^1$ and levels of ethoxylation. Often, especially at low levels of ethoxylation, a substantial amount of non-ethoxylated fatty alcohol remains in the final product, as well. Because of their excellent cleaning, environmental and stability profiles, fatty alcohol ethoxylates wherein $R^1$ represents an alkyl chain from 10-18 carbons and n is an average number between 5 and 12 are highly preferred.

Alkylphenol Ethoxylates $R^2ArO(EO)nH$ where $R^2$ represents a linear or branched alkyl chain ranging from 4 to 30 carbons, Ar is a phenyl (C6H4) ring and (EO)n is an oligomer chain comprised of an average of n moles of ethylene oxide. Preferably, $R^2$ is comprised of between 8 and 12 carbons, and n is between 4 and 12. Such materials are somewhat interchangeable with alcohol ethoxylates, and serve much the same function.

Ethylene Oxide/Propylene Oxide Block Polymers (EO)x(PO)y(EO)x or (PO)x(EO)y(PO)x wherein EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1,000 and 30,000 Daltons. BASF manufactures a suitable set of derivatives and markets them under the Pluronic® trademarks.

Other non-ionic surfactants should also be considered within the scope of this invention. These include condensates of alkanolamines with fatty acids, such as cocamide DEA, polyol-fatty acid esters, such as the Span® series available from Uniqema, ethoxylated polyol-fatty acid esters, such as the Tween® series available from Uniqema, alkyl polyglucosides and n-alkylpyrroli-dones, such as the Surfadone® series of products.

Preferred co-surfactants for use with the above ethoxylated nonionic surfactants are amides of the formula $R^1-(C=O)-NR^2R^3$ wherein $R^1$1 is an alkyl, hydroxyalkyl or alkenyl radical containing from about 8 to about 20 carbon atoms, and $R^2$ and $R^3$ are selected from the group consisting of hydrogen, methyl, ethyl, propyl, isopropyl, 2-hydroxyethyl, 2-hydroxypropyl, 3-hydroxypropyl, and said radicals additionally containing up to about 5 ethylene oxide units, provided at least one of $R^2$ and $R^3$ contains a hydroxyl group. Preferred amides are the C8-C20 fatty acid alkylol amides in which each alkylol group contains from 1 to 3 carbon atoms, and additionally can contain up to about 2 ethylene oxide units. Particularly preferred are the C12-C16 fatty acid monoethanol and diethanol amides.

Certain compositions herein preferably contain a mixture of the above ethoxylated nonionic surfactant and amide surfactant in a weight ratio of from about 4:1 to 1:4, preferably from about 3:1 to about 1:3, more preferably from about 2:1 to about 1:2. In addition, the weight ratio of anionic synthetic surfactant (on an acid basis) to the total nonionic surfactant (both the ethoxylated nonionic and the amide) should be from about 2:1 to about 4:1, preferably from about 2.5:1 to about 3.5:1. Other suitable cosurfactants are the quaternary ammonium, amine or amine oxide surfactants and di-long chain quaternary ammonium cationic surfactants, e.g. those having 2 chains, each containing an average of from about 16 to about 22 carbon atoms.

A further object of the invention is a method for debonding and recycling bonded article, wherein a bonded article is debonded according to the method as described above and recycling is accomplished by physically comminuting the debonded thermoplastic polyurethane and chemically treating the comminuted material to produce new thermoplastic polyurethane, for example as described in WO 2019/175151. The comminuted thermoplastic polyurethane is for example used in shredded form, in the form of granules, as an agglomerate, or as a powder. It is preferably used in the method as an agglomerate.

Therefore, a preferred method is a method for debonding and recycling bonded article, wherein a bonded article is debonded according to the method as described above and recycling is accomplished by a recycling process comprising at least steps (i) to (iii):
  (i) providing a debonded molded body of thermoplastic polyurethane,
  (ii) comminuting the molded body,
  (iii) agglomerating the comminuted molded body into an intermediate product (TPU-ZP).

Subsequently, the intermediate product TPU-ZP can be chemically treated to produce new thermoplastic polyurethane, for example as described in WO 2019/175151.

Preferably, an agglomerate with a mean particle diameter of 0.5 to 10 mm is used.

The recycling method can comprise further steps, for example cleaning steps, separation of the thermoplastic polyurethane from foreign materials such as e.g. metals or other plastics, color sorting, post-comminution of the intermediate product (TPU-ZP), mixing and homogenizing of the intermediate product (TPU-ZP), for example in a mixing silo, or mixing in of various intermediate products.

The debonded articles can be comminuted by conventional methods, for example by shredding, e.g. in a rotation mill or rotary mill at room temperature, to a particle size of ordinarily less than 20 mm, or ground, e.g. by known cold grinding processes, for example under cooling with liquid nitrogen in a roller mill or hammer mill. Preferably, a particle size of less than 20 mm is selected, for example a particle size in the range of 1 mm to 20 mm, and preferably in the range of 3 mm to 20 mm. Unless otherwise specified, the particle size is determined in the context of the present invention using a separating screen.

According to a further embodiment, the present invention therefore concerns a method as described above, wherein in comminuting the debonded molded body according to step (ii), a particle size of less than 20 mm is selected.

It is advantageous in recycling to prevent thermal loading of the thermoplastic polyurethane and to select a temperature for agglomeration that is in a specified range. According to a further embodiment, the present invention therefore concerns a method as described above, wherein in agglomeration according to step (iii), the temperature remains below the actual melting range of the thermoplastic polyurethane. According to a further embodiment, the present invention therefore concerns a method as described above, wherein in agglomeration according to step (iii), the temperature is below 200° C.

The granules, agglomerates, or the like from debonded and comminuted thermoplastic polyurethanes preferably show a particle size of 0.1 to 50 mm, preferably 0.5 to 25 mm, and in particular 2 to 10 mm. For the addition of granules, agglomerates, or the like from recycled thermoplastic polyurethanes to the reaction mixture before it is chemically treated to produce new thermoplastic polyurethane, the preferred particle size is 0.5 to 10 mm.

The recycled, new thermoplastic polyurethanes obtained or obtainable by the method according to the invention show favorable mechanical properties and can be used in conventional methods for processing thermoplastic polyurethanes. Particularly advantageously, the thermoplastic polyurethanes obtained or obtainable by the method according to the invention can be used in injection molding methods for producing molded bodies.

A suitable method for chemical treatment to produce new thermoplastic polyurethane comprises the steps of
  (a) reacting at least one of the debonded and comminuted thermoplastic polyurethane (TPU-1) or a polyurethane mixture comprising TPU-1 with a compound (V1) that comprises two hydroxyl groups, thus obtaining a mixture (G-a) comprising a thermoplastic polyurethane (TPU-2), wherein the mean molecular weight of the thermoplastic polyurethane (TPU-2) is less than the mean molecular weight of the thermoplastic polyurethane (TPU-1); and
  (b) reacting the mixture (G-a) with a mixture (G-b) comprising an isocyanate composition (ZI) comprising at least one diisocyanate and optionally a polyol composition (ZP) comprising at least one polyol (P2), thus obtaining a recycled, new thermoplastic polyurethane (TPU target).

Details of this chemical treatment method are described in WO 2019/175151.

EXAMPLES

Abbreviations and Ingredients

| | |
|---|---|
| IPDI | isophorone diisocyanate |
| HDI | hexamethylene diisocyanate |
| Lutensol ® AT18 | C16-18 fatty alcohol ethoxylate, 18 ethylene oxide units |

Example 1

Polyurethane Dispersion Adhesive According to Example 1 in WO 2012/13506

996.77 g of a polyesterdiol made of adipic acid and 1,4-butanediol (OH number=43.9) and 0.13 g of tetrabutyl titanate (TBOT) are dissolved in 260 g of acetone and heated to 60° C., and reacted at 65° C. for 1 h with 46.2 g of toluene diisocyanate; the mixture is then further reacted at 66° C. for 3.5 h with 44.6 g of hexamethylene diisocyanate. The mixture is then diluted with 1040 g of acetone and cooled to 50° C. NCO content is then 0.5%. 51.2 g of a 40% strength aqueous solution of the sodium salt of aminoethylamino propionic acid are then used for 15 minutes for chain-extension, and the mixture is dispersed using 1638 g of deionized water. The acetone is removed by distillation at temperatures up to 43° C. in vacuo, and solids content is adjusted to 40%.

Analysis values: LD: 87.5; viscosity: 32 mPas; K value: 51; pH: 8.0

Example 2

Polyurethane Dispersion Adhesive 676 g of a polyesterdiol from adipic acid and 1,4 butanediol (OH number 45) are reacted with 0.11 g titanium tetrabutylate, 40 g IPDI, 0.77 g NCO-terminated polycarbodiimid (Elastostab® H02, BASF) at 60° C. in 153 g dry acetone for 60 min. Then 37.8 g HDI is added and the temperature raised to 74° C. The reaction is continued until the NCO-value is lower than 1.25%. The mixture is diluted with 539 g acetone and cooled to 35-40° C. Then 22.4 g of aminoethyl aminoethane sulfonate sodium salt (50% in water) diluted with 22 g demineralized water is added in 3 min, followed by 4.6 g isophoronediamine diluted in 23 g demineralized water in 3 min. Before dispergation 38.7 g of a 20% aqueous solution of Lutensol® AT18 (BASF) is added as, followed by dispergation with 463 g demineralized water in 15 min. Immediately after the water feed, 4 g of N-(2-aminoethyl)-ethanolamine in 30 g water is added in 15 min, with additional amount of 200 g demineralized water. The acetone is removed by vacuum distillation with the help of two drops of defoamer (FoamStar® PB 2724, BASF) and the solids content adjusted to 50%.

K-value: 60

Example 3

Commercial TPU hotmelt Elastollan® Hotbond AH 810 (BASF)

Thermoplastic polyurethane elastomer;

Shore A hardness 98±2;

minimum flow temperature 60±10° C.

melt index 10±5 g/10 mins (2.16 kg; 150° C.)

K-value: 55.3

Example 4

Polyurethane Dispersion Adhesive According to Example 1 in WO 2007/082826

745 g (0.30 mol) of a polyesterdiol with an OH number of 45.2 (based on butanediol/adipic acid), 13.4 g (0.10 mol) of dimethylolpropionic acid, 1.0 g of tetrabutyl orthotitanate (10% form), and 100 g of acetone are introduced as an initial charge, admixed at 60° C. with 112.3 g (0.505 mol) of isophorone diisocyanate, and stirred at 90° C. for 4 hours. Then, in succession, 900 g of acetone, 20.25 g of triisopropanolamine (0.09 mol), 5 g of carbodiimide (polymer based on 1,3-bis(1-isocyanato-1-methylethyl)benzene, isocyanate end groups) in 5 g of acetone (0.005 mol), 0.97 g of aminopropyl trimethoxysilane (0.005 mol), 31.35 g of aminoethyl aminoethane sulfonic acid Na salt (0.075 mol), and 40 g of water are metered in and the reaction mixture is stirred for a further 20 minutes. It is dispersed with 1300 g of water; afterward the acetone is distilled off under reduced pressure and the solids content is adjusted to approximately 40%.

Analytical Data:

Solids content: 43.3%

LT: 91.9

Viscosity 169 mPas pH: 8.1

K value: 94.5

Example 5

Polyurethane Dispersion Adhesive 2284 g of polyTHF 2000 (polytetrahydrofuran; OH number=56 mg KOH/g), 0.4 g tetrabutyl titanate and 138.4 g dimethylolpropionic acid (DMPA) are reacted at 95° C. in 266 g water-free acetone with 524.6 g isophorone diisocyanate (IPDI) to a NCO-content of 0.6%. The mixture is then diluted with 3534 g of acetone and cooled to 31° C. The mixture is neutralized with 41.8 g triethylamine and chain extended with 13.6 g of isophoronediamine (IPDA) in 76 g deionized water. After 5 min the mixture is dispersed using 2926 g of deionized water. The acetone is removed by distillation in vacuo, and solids content is adjusted to 50%.

K-value: 50

General Method of Bonding the Components:

The polyurethane dispersion is formulated with 1 wt. % of a thickener (Rheovis® PU1235). The adhesive is then brushed on the first and second components (e.g. on the sole material and on the textile material) in amounts of 80-120 g/m$^2$ (based on solids). After 15 min drying at 70° C., the parts are pressed together for 30 s with 5 bar in a press and stored for 24 hours before testing.

The polyurethane hotmelt adhesive was applied in the molten form at 90° C.

Press temperature was also 90° C.

Peel Strength Determination

Examples 6/1-6/3; One TPU Foam Part+One Textile Material

180° Peel Test Method:

The bond strength is measured by a peel test of two bonded components (e.g. a textile material against a shoe sole material) as following:

The adhesive is applied on both sides of the material (textile and sole, 200*50 mm). In case of a dispersion adhesive, the dispersion is dried 15 min at 70° C. In case of a hot melt adhesive, the hotmelt is activated 15 min at 90° C. After joining, the specimen is pressed 30 seconds at 5 bar. After a storage time of 24 h at room temperature the specimens are tested with 180° peel test apparatus at a testing speed of 100 mm/min.

Example 6/1

An expanded thermoplastic polyurethane foam (E-TPU foam; BASF Infinergy® X1125-130U) was bonded to a polyester textile by using the adhesive of example 1. A 180° peel test was performed and gave 42 N/50 mm as average of 3 test specimen with cohesive failure and some material break in the foam.

Example 6/2

An expanded thermoplastic polyurethane foam (E-TPU foam; BASF Infinergy® 32-100 U10) was bonded to a polyester textile by using the adhesive of example 2. A 180° peel test was performed and gave 120 N/50 mm as average of 3 test specimen with some material break in the foam.

De-Bonding

Example 7: One TPU Foam Substrate+One Textile Material

Example 7/1

A E-TPU foam (BASF Infinergy® X1125-130U) was bonded to a polyester textile by using the adhesive of example 1.

Example 7/2

A E-TPU foam (BASF Infinergy® X1125-130U) was bonded to a polyester textile by using the adhesive of example 2.

Example 7/3

A E-TPU foam (BASF Infinergy® X1125-130U) was bonded to a polyester textile by using the TPU hotmelt adhesive Elastollan® Hotbond AH 810 of example 3.

The bonded parts are cut into pieces of 3×2 cm and immersed in the hot surfactant solutions. The time is evaluated until the textile is delaminated by stirring or the two solid substrates fall apart. Additionally, a potential de-bonding is tested by hand.

Surfactant solution 1, used in table 1:
2 ml commercial liquid laundry detergent "Weißer Riese® Universal Gel" in 1l demineralized water; pH 8.8

Surfactant solution 2 used in tables 2 and 3:
10% solution of commercial industrial cleaner Mucasol®+ silicone antifoam agent (1 ml/l);
pH 11.6

The results are summarized in tables 1 and 2.

TABLE 1

De-bonding test results; surfactant solution 1

| | 40° C. | 90° C. | 100° C. |
|---|---|---|---|
| Example 7/1 | No delamination after 30 min, detachment by hand possible | Delamination after 15 min, adhesive on TPU | Delamination after 2 min, no residuals on TPU |
| Example 7/2 | No delamination after 90 min, no detachment by hand possible | Delamination after 30 min. adhesive on TPU | Delamination after 10 min, adhesive on TPU |
| Example 7/3 | No delamination after 90 min, no detachment by hand possible | Delamination after 30 min, few residuals on TPU | Delamination after 4 min, no residuals on TPU |

TABLE 2

De-bonding test results; surfactant solution 2

| | 40° C. | 97-100° C. |
|---|---|---|
| Example 7/1 | delamination after 40 min, no adhesive on TPU material | delamination after 2 min no adhesive on TPU material |
| Example 7/2 | no delamination after 90 min, no detachment by hand | partially delaminated easily to detach by hand |

Example 8: Two Solid E-TPU Components

Example 8/1

Two E-TPU foam parts (Infinergy® X1125-130U, 14*5*1.3 cm)/Infinergy® X1125-130U, 14*5*1.2 cm) were bonded with adhesive of example 1.

Example 8/1

Two E-TPU foam parts (Infinergy® X1125-130U, 14*5*1.3 cm)/Infinergy® X1125-130U, 14*5*1.2 cm) were bonded with adhesive of example 2.

Example 8/3

Two E-TPU foam parts (Infinergy® X1125-130U, 14*5*1.3 cm)/Infinergy® X1125-130U, 14*5*1.2 cm) were bonded with TPU hotmelt adhesive Elastollan® Hotbond AH 810 of example 3.

The bonded parts are cut into pieces of 3×2 cm and immersed in the hot surfactant solution 2. The time is evaluated until the textile is delaminated by stirring or the two solid substrates fall apart. Additionally, a potential debonding is tested by hand.

The results are summarized in table 3.

TABLE 3

De-bonding test results; surfactant solution 2

| | 40° C. | 97-100° C. |
|---|---|---|
| Example 8/1 | Delamination after 40 min | Delamination after 2 min |
| Example 8/2 | No delamination after 90 min; heavily to detach by hand | Delamination after 30 min |
| Example 8/3 | No delamination after 90 min; heavily to detach by hand | Delamination after 30 min |
| Example 10 | No delamination in 60 min; no separation by hand possible | No delamination in 60 min; no separation by hand possible |

Example 9

563 g of a polyesterdiol from adipic acid and 1,4 butane-diol (OH number 45) are reacted with 0.17 g of a catalyst (Borchikat 315, Borchers), 67.9 g isophorone diisocyanate (IPDI) at 60 to 65° C. in 90 g dry acetone until a NCO-value of 0.9% is reached. The mixture is diluted with 630 g acetone and cooled to 50° C. Then 21.8 g of aminoethyl-aminoethane-sulfonate sodium salt (50% in water) diluted with 22 g deionized water is added in 3 min. After 10 min the dispersion is continued with 927 g deionized water. The acetone is removed by vacuum distillation with the help of two drops of defoamer (FoamStar® PB 2724, BASF) and the solids content adjusted to 40% K-value 71

Example 10 (Comparative)

The polyurethane dispersion of example 1 is formulated with 1 wt. % of a thickener (Rheovis® PU 1235, BASF) and 5 wt. % of a crosslinker (Basonat® F 200 WD, BASF).

The crosslinked polyurethane dispersion is coated onto the components and pressed according to example 6/1.

A K-value measurement gave an insoluble sample, turbid and exceeding the measurable range, i.e. a K value above 100.

The debonding test results are summarized in table 3.

Example 11

An expanded thermoplastic polyurethane foam (E-TPU foam; BASF Infinergy® X1125-130U, 14*5*1 cm) was bonded to a polyester textile by using the adhesive of example 5, formulated with 1 wt. % of a thickener (Rheovis® PU 1235, BASF). A 180° peel test was performed and gave 136 N/50 mm as average of 3 test specimen with material break in the foam.

The debonding test results are summarized in table 4.

Example 12 (Comparative)

The polyurethane dispersion of example 5 is formulated with 1 wt. % of a thickener (Rheovis® PU 1235, BASF) and 5 wt. % of a crosslinker (Basonat® F 200 WD, BASF). The crosslinked polyurethane dispersion is coated onto the components and pressed according to example 6/1. A K-value measurement gave an insoluble sample, turbid and exceeding the measurable range, i.e. a K value above 100.

An expanded thermoplastic polyurethane foam (E-TPU foam; BASF Infinergy® X1125-130U, 14*5*1 cm) was bonded to a polyester textile by using the crosslinked adhesive of example 5. A 180° peel test was performed and gave 137 N/50 mm as average of 3 test specimen with material break in the foam.

The debonding test results are summarized in table 4.

Example 13

Two E-TPU foam parts (BASF Infinergy® X1125-130U, 14*5*1 cm/X1125-130U, 14*5*1 cm) were bonded by using the adhesive of example 5, formulated with 1 wt. % of a thickener (Rheovis® PU 1235, BASF).

The debonding test results are summarized in table 4.

Example 14 (Comparative)

Two E-TPU foam parts (BASF Infinergy® X1125-130U, 14*5*1 cm/X1125-130U, 14*5*1 cm) were bonded by using the adhesive of example 5, formulated with 1 wt. % of a thickener (Rheovis® PU 1235, BASF) and 5 wt. % of a crosslinker (Basonat® F 200 WD, BASF). The debonding test results are summarized in table 4.

TABLE 4

| De-bonding test results; surfactant solution 1 | | |
| --- | --- | --- |
| | 40° C. | 97-100° C. |
| Example 11 | No delamination in 60 min; no separation by hand possible | delamination in 10 min; |
| Example 12 Comparative | No delamination in 60 min; no separation by hand possible | No delamination in 60 min no separation by hand possible |
| Example 13 | No delamination in 60 min; no separation by hand possible | delamination in 10 min; |
| Example 14 comparative | No delamination in 60 min; no separation by hand possible | No delamination in 60 min; no separation by hand possible |

The invention claimed is:

1. A method for debonding a bonded article, wherein the bonded article comprises at least a first component and a second component which are bonded to one another by means of a polyurethane adhesive with a K value of not more than 100, measured as 1 wt. % solution in DMF at 25° C.;
wherein the first component is made from a thermoplastic polymer;
wherein the polyurethane adhesive is selected from the group consisting of aqueous polyurethane dispersion adhesives and polyurethane hotmelt adhesives;
and the at least two components are debonded by treatment with an aqueous surfactant composition at a temperature from 60° C. to 130° C., and at a pH of 4 to 12.

2. The method according to claim 1, wherein the thermoplastic polymer is a thermoplastic elastomer selected from the group consisting of thermoplastic polyurethane, thermoplastic copolyamide, thermoplastic polyester elastomer and styrenic block copolymers and mixtures or blends thereof.

3. The method according to claim 2, wherein the thermoplastic polymer is an expanded thermoplastic polyurethane.

4. The method according to claim 1, wherein the first component is an expanded thermoplastic polyurethane and the second component is a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a polyethylene terephthalate, a polybutylene terephthalate, a textile, a fabric, a thermoplastic polyurethane knit fiber and a combination thereof.

5. The method according to claim 1, wherein the bonded article is an extruded article, an injection molded article, a pressed article, a foamed article, a cable sheath, a hose, a profiled element, a drive belt, a fiber material, a nonwoven, a film, a molded part, a sole, a sporting good, an article of footwear, a part of an article of footwear, a plug, a housing, or a damping element for the electrical industry, for the automobile industry, for machine construction, for 3D printing, for medicine, or for consumer goods.

6. The method according to claim 1 wherein the first component is a shoe sole made of thermoplastic polyurethane; and the second component is a shoe upper made of polyethylene terephthalate.

7. The method according to claim 1, wherein the bonded article is resistant to debonding at temperatures up to 60° C. without treatment with aqueous surfactant composition and resistant to debonding by treatment with aqueous surfactant compositions at temperatures up to 40° C.

8. The method according to claim 1, wherein the polyurethane adhesive is an aqueous adhesive polyurethane dispersion and the polyurethane is characterized by a K value of from 45 to 100, measured as 1 wt. % solution in DMF at 25° C.; by a melting point of from 40 to 70° C.; by a glass transition temperature of less than −10° C., measured by differential scanning calorimetry as the midpoint temperature of the second heating curve at a heating rate of 20 K/min,
and the dispersed polyurethane is constructed from
a) at least one organic diisocyanate, selected from diisocyanates of the formula X(NCO)2, where X is a non-cyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms, wherein the amount of aromatic diisocyanates is less than 60 mol %, based on the sum of all organic diisocyanates a),
b) at least one dihydroxy compound selected from the group consisting of polyesterdiols and polytetrahydrofuran,
c) at least one compound having at least one group reactive toward isocyanate groups, and additionally carrying at least one ionic group or one group which can be converted into an ionic group, d) optionally further compounds different from a) to c); wherein the polyurethane adhesive optionally contains at least one additive selected from the group consisting of ionic surfactants, nonionic surfactants, rheology modifiers, fillers, plasticizers, stabilizers against hydrolytic degradation and biocides.

9. The method according to claim 1, wherein the treatment with an aqueous surfactant composition is characterized by soaking pieces of the bonded articles in aqueous solutions of surfactants at a pH of from 6 to 10, and temperatures from 60° C. to 100° C. for up to 60 min while stirring or shaking.

10. The method according to claim 1, wherein the method comprises treatment of the bonded articles or parts thereof at a temperature of 60 to 100° C. at a pH of from 7 to 9 for a time of from 2 to 60 minutes with an aqueous surfactant composition comprising from 0.1 to 80 wt. % of at least one surfactant in water, wherein the surfactant is selected from the group consisting of anionic and nonionic surfactants, and optional further additives selected from the group consisting of defoamers, solvents, and bases.

11. The method according to claim 1, wherein the amount of polyurethane adhesive used for bonding the bonded components is from 10 g/m$^2$ to 400 g/m$^2$ (solid).

12. The method according to claim 1, wherein no residual adhesive remains on the thermoplasti polymer after debonding.

13. A recyclable article of footwear or portion thereof comprising a first component, a second component, and a polyurethane adhesive adhesively bonding the first component to the second component wherein at least one of the components is a thermoplastic polyurethane, wherein the polyurethane adhesive has a K value of not more than 100, measured as 1 wt % solution in DMF at 25° C. and is selected from aqueous polyurethane dispersion adhesives and polyurethane hotmelt adhesives;

and the at least two components are debondable by treatment with an aqueous surfactant composition at a temperature from 60° C. to 130° C. and at a pH of 4 to 12.

14. The article of footwear or portion thereof according to claim 13, wherein the first component, the second component, or both comprise a component selected from the group consisting of an upper, an insole, an outsole, a midsole, a strobel, a vamp, a tip, a foxing, a tongue, an eyestay, and a combination thereof.

15. The article of footwear or portion thereof according to claim 13, wherein the article of footwear is selected from the group consisting of a shoe, a boot, and a sandal.

16. The article of footwear or portion thereof according to claim 13 wherein the first component is a shoe sole made of thermoplastic polyurethane; and the second component is a shoe upper.

17. A method for debonding and recycling bonded article, wherein a bonded article is debonded according to the method of claim 1
and recycling is accomplished by a recycling process comprising at least steps (i) to (iii):
(i) providing a debonded molded body of thermoplastic polyurethane,
(ii) comminuting the molded body,
(iii) agglomerating the comminuted molded body into an intermediate product.

18. The method according to claim 17, wherein the intermediate product is chemically treated to produce new thermoplastic polyurethane.

* * * * *